United States Patent
Kato

(10) Patent No.: US 7,139,569 B2
(45) Date of Patent: Nov. 21, 2006

(54) SERVICE SEARCHING SYSTEM

(75) Inventor: Akira Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 352 days.

(21) Appl. No.: 09/996,750

(22) Filed: Nov. 30, 2001

(65) Prior Publication Data

US 2002/0037713 A1 Mar. 28, 2002

(30) Foreign Application Priority Data

Dec. 1, 2000 (JP) ............................. 2000-366701

(51) Int. Cl.
*H04Q 7/20* (2006.01)

(52) U.S. Cl. ............................. 455/432.3; 455/456.1; 455/414.1; 455/425; 455/557

(58) Field of Classification Search ................ 455/456, 455/414.1, 517, 412, 450, 452, 435, 445, 455/560, 466; 342/357, 357.09; 375/202; 709/217, 219, 225, 313, 329, 203, 226, 201, 709/229, 105
See application file for complete search history.

(56) References Cited

U.S. PATENT DOCUMENTS

| | | | |
|---|---|---|---|
| 6,209,018 B1 * | 3/2001 | Ben-Shachar et al. | 709/105 |
| 6,216,158 B1 * | 4/2001 | Luo et al. | 709/217 |
| 6,553,425 B1 * | 4/2003 | Shah et al. | 709/245 |
| 6,580,916 B1 * | 6/2003 | Weisshaar et al. | 455/456 |
| 6,604,127 B1 * | 8/2003 | Murphy et al. | 709/203 |
| 6,604,140 B1 * | 8/2003 | Beck et al. | 709/226 |

(Continued)

FOREIGN PATENT DOCUMENTS

JP H10-11375 A1 1/1998

(Continued)

OTHER PUBLICATIONS

Portable wireless terminal (p. 168, right column.); pursuing communications efficiency by using a protocol installed in a portable wireless terminal (p. 156, right column.); realizing highly reliable communications by retransmission control, etc. (p. 156, left column.); and controlling communications traffic by utilizing a cache (p. 161, middle column.).

(Continued)

*Primary Examiner*—Charles Appiah
*Assistant Examiner*—Joy Contee
(74) *Attorney, Agent, or Firm*—Sughrue Mion, PLLC

(57) ABSTRACT

A service searching system for searching a service in a distributed system comprises a wireless server device and a wireless terminal device. The wireless server device is connected to a network and implements a master search service. On the other hand, the wireless terminal device implements a slave search service, and is capable of communicating with the server by wireless and utilizing the master search service. Besides, the wireless terminal device comprises a storage means that caches service objects obtained through the master search service. In addition, in searching the slave search service for a service, the wireless terminal device begins by searching the service objects cached in the storage means. In the case where the service is not detected, the wireless terminal device searches the master search service. The service objects are cached by being related to priority data. Thereby, there is provided a service searching system comprising a wireless terminal device, which is intended to search for a service in a distributed system in which a range of services are distributed in a network, wherein it is possible to cut down a service-searching time and costs, and further, it is possible to cut down communication interruptions by noise etc. in the wireless communication section compared to the conventional one.

7 Claims, 10 Drawing Sheets

U.S. PATENT DOCUMENTS

| | | | |
|---|---|---|---|
| 6,813,502 B1* | 11/2004 | Son et al. | 455/456.3 |
| 2004/0205771 A1* | 10/2004 | Sudarshan et al. | 719/316 |
| 2005/0102353 A1* | 5/2005 | Murphy et al. | 709/203 |
| 2005/0175005 A1* | 8/2005 | Brown | 370/389 |

FOREIGN PATENT DOCUMENTS

| | | |
|---|---|---|
| JP | H11-73357 A1 | 3/1999 |

OTHER PUBLICATIONS

Java Press Embedded Computing; construction of a Jini network using a wireless LAN.

* cited by examiner

F I G. 4
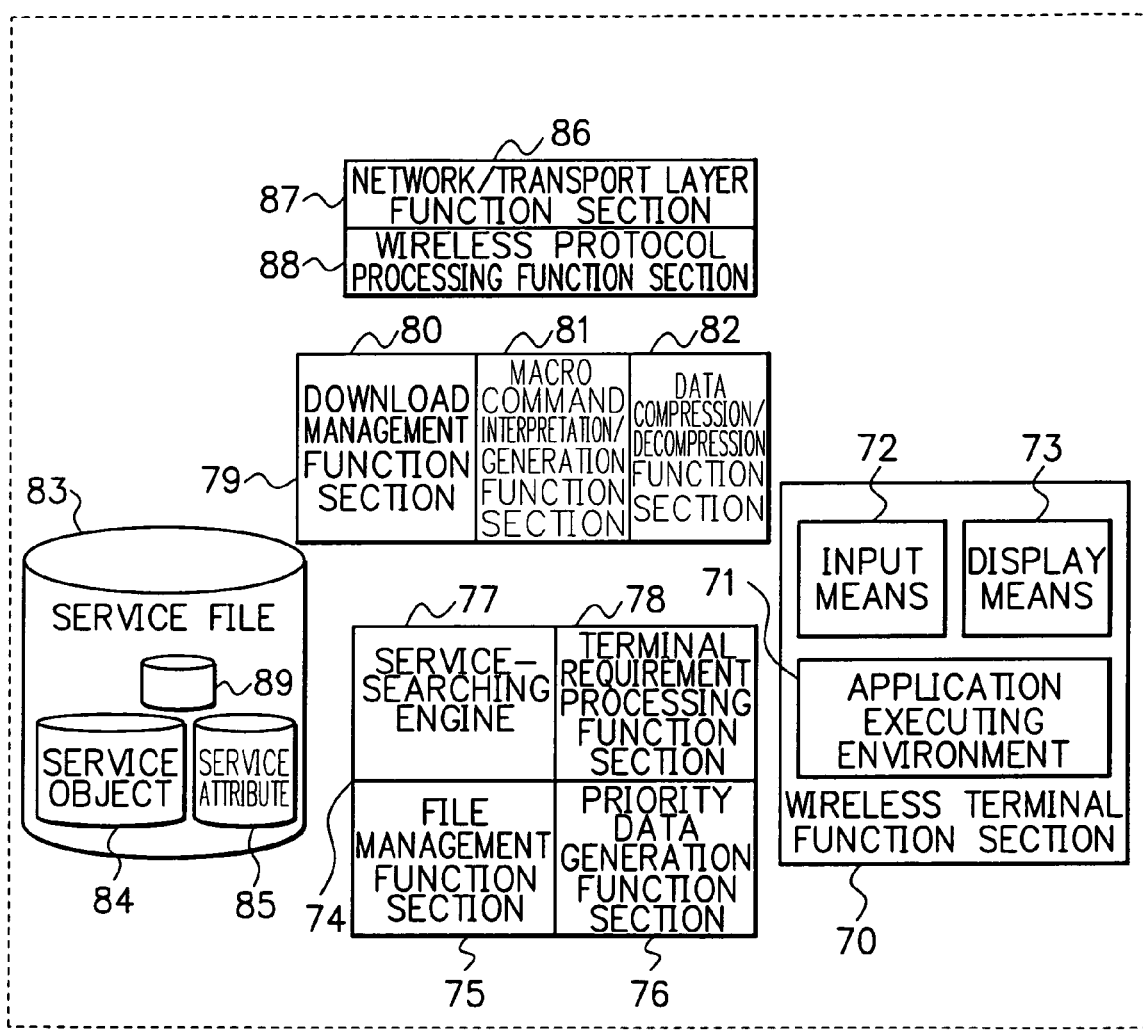

F I G. 9
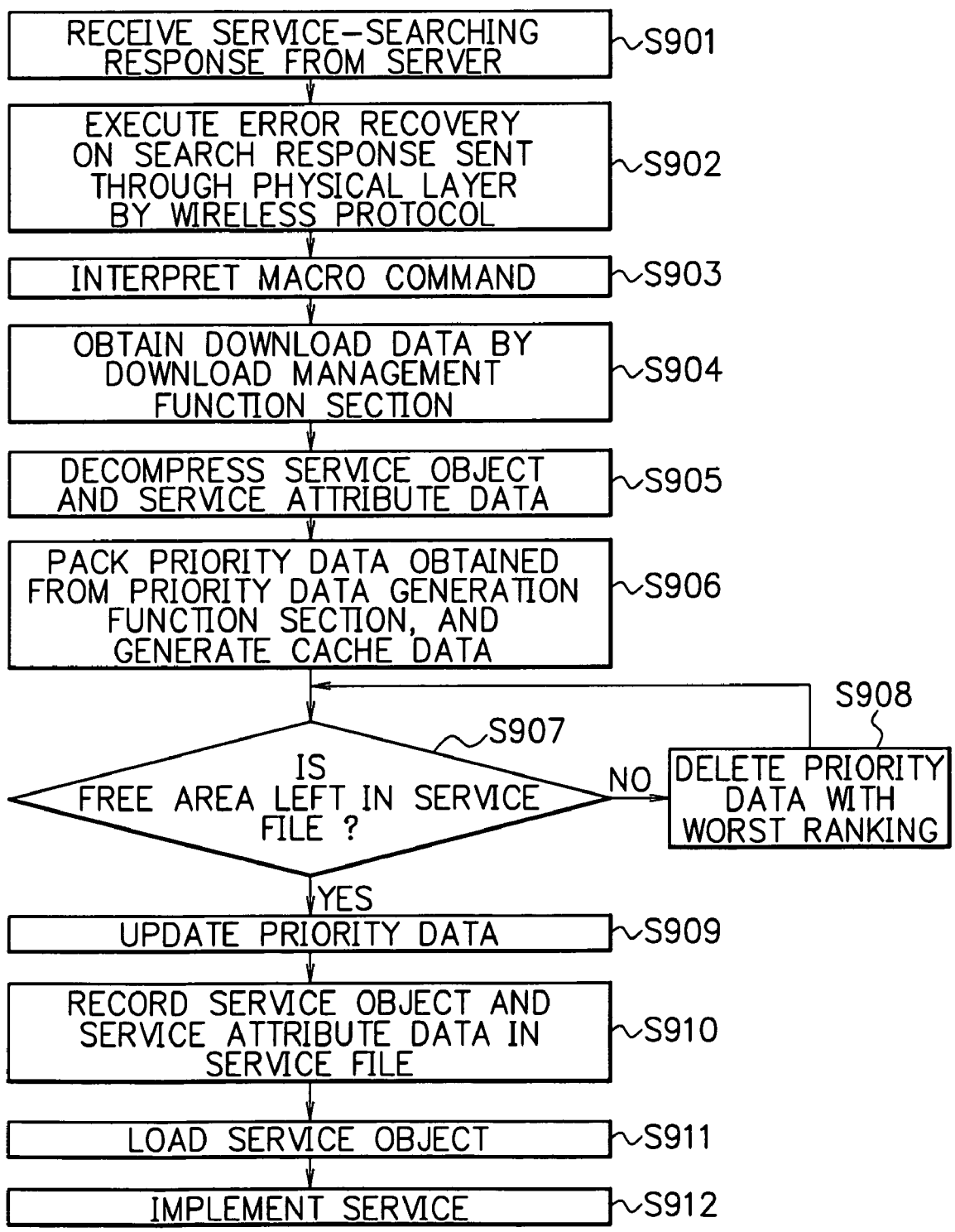

F I G. 10
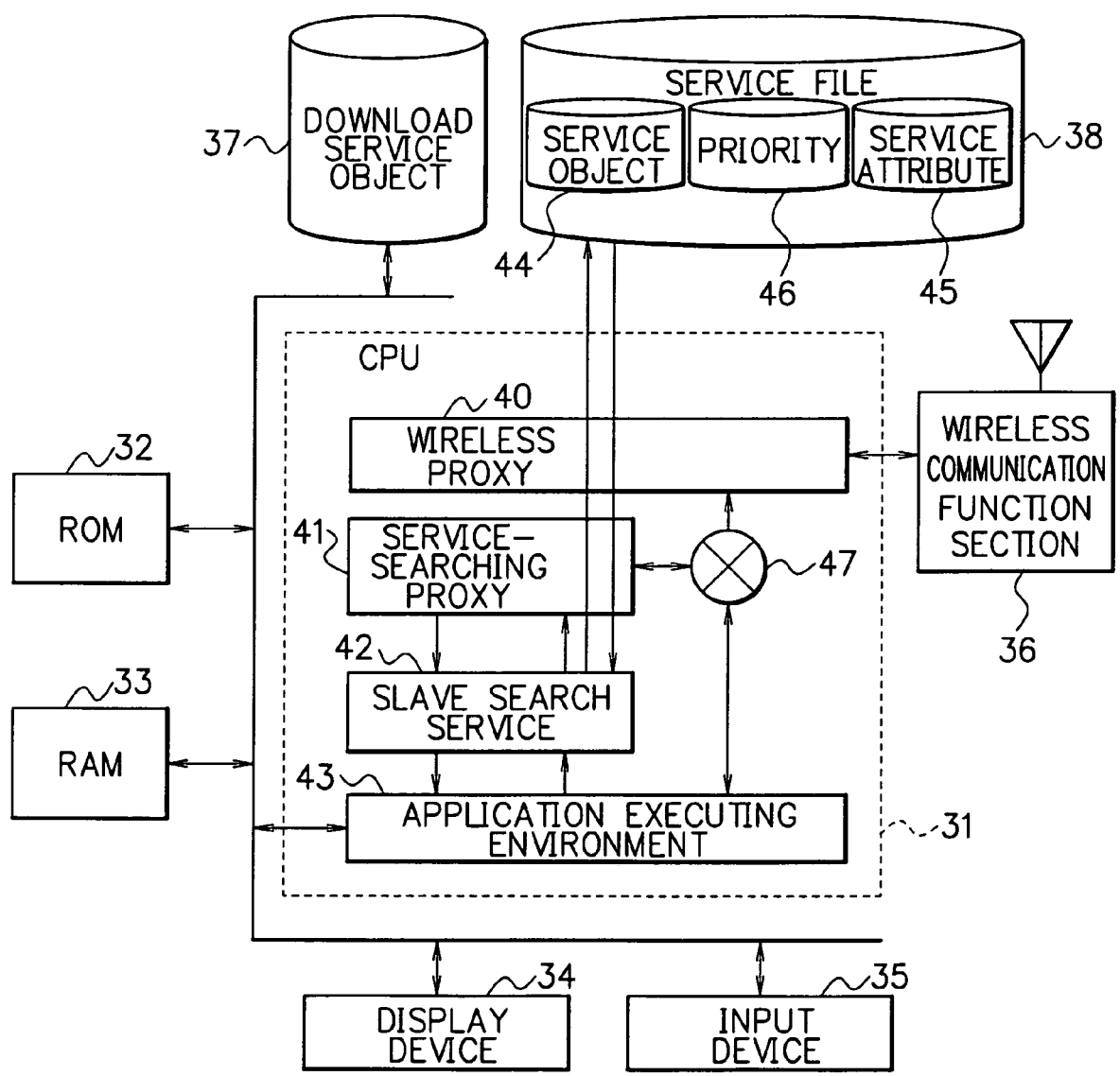

SERVICE SEARCHING SYSTEM

BACKGROUND OF THE INVENTION

The present invention relates to a service searching system wherein it is possible to receive a desired service delivery by searching for a service using a terminal device in a distributed system, in which a range of services are distributed in a network, and in particular, to a service searching system using a wireless terminal device connected to a network by wireless.

DESCRIPTION OF THE RELATED ART

In recent years, it is no exaggeration to say that the world is pursuing a way to distributed systematization by a range of networks, as seen in explosive prevalence of the Internet, corporate LANs (local area network), and further mobile terminals such as PDAs (personal digital assistant) and cellular phones. Under such circumstances, it is hardly enough for a range of necessary services to be kept only in a terminal device and to be connect to a terminal device fixedly (including connections by LAN etc.).

Thereby, in a distributed system in which a range of services are distributed in a network, a network middleware begins to make a mark. The network middleware is meant to construct a distributed system wherein it is possible to search for a desired service among a range of services distributed in a network using a terminal device existing in the network, communicate with the service, and receive the service delivery.

The system wherein a client in a network searches for and uses services distributed and existing in a network has been realized by the network middleware, which has been disclosed as some specifications of the network middlewares.

For example, there is known Jini that is a specification of a network middleware developed by Sun Microsystems Inc. The Jini system will be applied to embodiments of the present invention described later as an example. Here is an explanation of the structure of service searching in the Jini system. Incidentally, Discovery protocol, Join protocol, and Lookup protocol shown in the following explanation are names of protocol defined in Jini. FIGS. 1A to 1D are conceptual diagrams showing the service searching in the Jini system.

As shown in FIG. 1A, a Lookup service 21 (in Jini, search service is termed a Lookup service), a service provider 23 delivering a service(s), and a client 22 exist in a network 24. The service provider 23 has a plurality of service objects 25 and a plurality of service attributes 26.

Having been connected to the network 24, first, the service provider 23 transmits a message 1001 by the Discovery protocol in order to search for the Lookup service 21 that exists somewhere in the network 24. The Lookup service 21 responds to the Discovery, and imparts its whereabouts by sending back the reference of the whereabouts to the service provider 23.

In FIG. 1B, having detected the Lookup service 21, the service provider 23 transmits a message 1002 by the Join protocol in order to transfer the service objects 25 to deliver services of the service provider 23, and the service attributes 26 to make it possible to search for a desired service from among the services in the Lookup service 21, to the Lookup service 21 and register them in it. Thereby, the service objects 25 and the service attributes 26 are stored in the Lookup service 21.

In FIG. 1C, the client 22 who requires a specific service executes the Discovery protocol in order to search for the Lookup service 21 that exists somewhere in the network 24. This process is the same as that shown in FIG. 1A except that the client 22 transmits the Discovery protocol, and thereby, the diagram is skipped. Having detected the Lookup service 21, the client 22 transmits a message 1003 by the Lookup protocol in order to search for the desired service.

Concurrently with transmitting the message 1003, the client 22 transmits service attribute information in order to search for the desired service from among a plurality of services registered in the Lookup service 21. In the Lookup protocol, the Lookup service 21 collates the transmitted service attribute information with service attributes of the services registered in the Lookup service 21, and judges whether or not the corresponding service attribute exists. If a corresponding service is detected, the service object 25 of the desired service is downloaded (1004) to the client 22.

As shown in FIG. 1D, after the service is detected in the Lookup service 21 and the service object 25 is downloaded to the client 22, the client 22 can communicate with the service provider 23 and receive the service delivery by using the downloaded service object 25.

By the way, in the conventional specification of the network middleware, it is assumed that a fast and stable network such as LAN is suitable for an environment of a distributed system. Therefore, there is hardly any consideration for a case of using a system such as a cellular phone whose transmission speed is relatively low and communication quality is unstable.

Namely, the conventional technique has the following problems. The first problem is that, if the conventional technique is applied to wireless communication, not only does it take long time to communicate but also it costs. This is because a high-capacity network is assumedly used in the conventional technique, and thereby, the amount of communication data becomes large. The second problem is that, although communication interruptions may occur frequently by noise etc. because of unstable communication quality in wireless communication, there is hardly any consideration in a specification level.

SUMMARY OF THE INVENTION

It is therefore an object of the present invention to provide a service searching system to search for a service in a distributed system in which a range of services are distributed in a network, wherein it is possible to reduce time and costs of service searching, and further, there are less communication interruptions by noise etc. in a wireless communication section compared to the conventional one despite the fact that the system comprises a wireless terminal device.

According to a first aspect of the present invention, for achieving the object mentioned above, there is provided a service searching system that searches for a service in a distributed system wherein a range of services are distributed in a network, comprising: a wireless server device connected to the network and implementing a master search service; and a wireless terminal device implementing a slave search service, being capable of communicating with the server by wireless, and being capable of utilizing the master search service, wherein: the wireless terminal device includes a storage means for caching at least one service object obtained through the master search service; in the case of searching for the service through the slave search service, the wireless terminal device begins by searching the at least one service object cached in the storage means; and in the case of failing to detect the service in the slave search service, the wireless terminal device searches for the service through the master search service. Thereby, in respect of the cached services, it is possible to construct an environment to receive the services without communicating with the network. Namely, depending on contents of the services, it may be possible to receive the service deliveries without communication.

According to a second aspect of the present invention, in the first aspect: priority data corresponding to each of at least one service object that is to be cached in the wireless terminal device is generated on the basis of at least one selected from necessity, importance and frequency in use of each of the at least one service object in the wireless terminal device; the priority data is related to each of the at least one service object and cached together; the priority data is updated according to use of the at least one service object; and when the cached at least one service object overflows in order to cache a new service object in the wireless terminal device, at least one low-priority service object is deleted on the basis of the priority data. Thereby, high-priority and important services are being cached at the point. Therefore, it is possible to increase percent hit rates of the service objects cached in the wireless terminal device.

According to a third aspect of the present invention, in the first or second aspect: when the wireless terminal device searches the wireless server device for the service through the master search service, communication between the wireless terminal device and the wireless server device is executed by being converted into a command and a parameter in which an amount of communication data is reduced. Thereby, it is possible to reduce overhead of a protocol of a network middleware and traffic in the wireless communication.

According to a fourth aspect of the present invention, in one of the first to third aspects, a wireless communication protocol between the wireless terminal device and the wireless server device implements a means for assuring communication quality in a wireless section as a protocol. Thereby, it is possible to realize a quality assurance of the wireless communication.

BRIEF DESCRIPTION OF THE DRAWINGS

The object and features of the present invention will become more apparent from the consideration of the following detailed description taken in conjunction with the accompanying drawings in which:

FIG. 4 is a diagram explaining functions of a wireless terminal device section in detail according to the first embodiment of the present invention;

FIGS. 7, 8 and 9 are functional flowcharts explaining operations of the first embodiment of the present invention; and FIG. 10 is a block diagram showing a configuration of a wireless terminal device according to a second embodiment of the present invention.

DESCRIPTION OF THE PREFERRED EMBODIMENTS

Figure 1A:
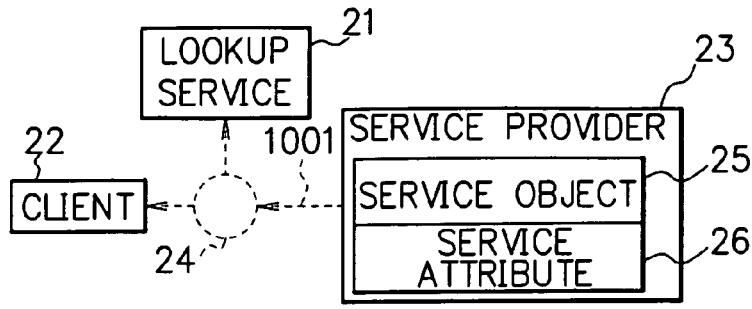
FIGS. 1A to 1D are conceptual diagrams showing a service searching in a Jini system.
Figure 1B:
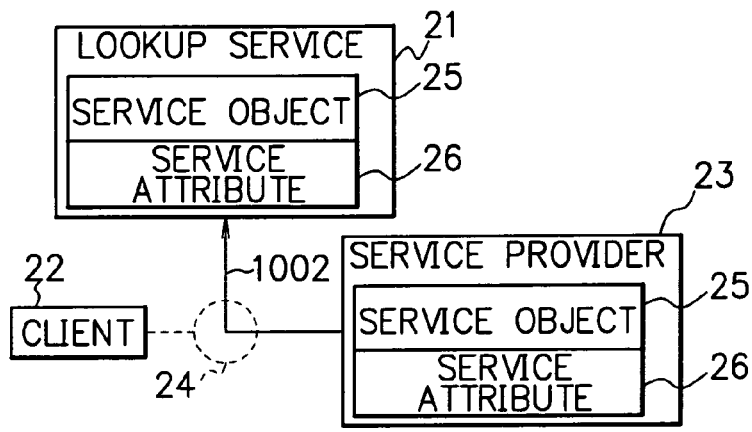
Figure 1C:
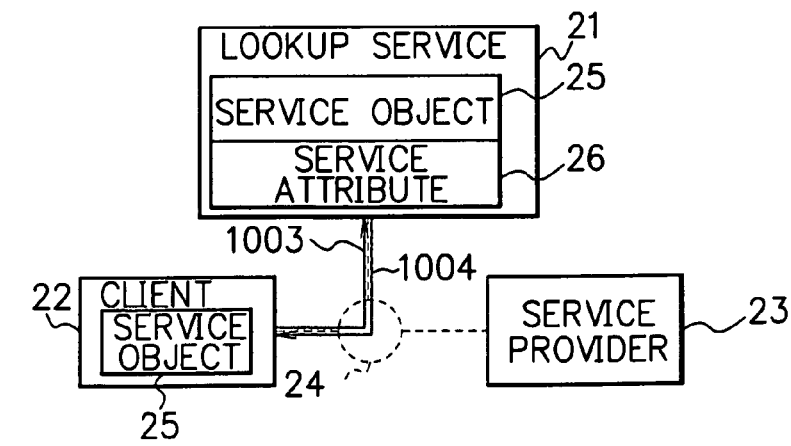
Figure 1D:
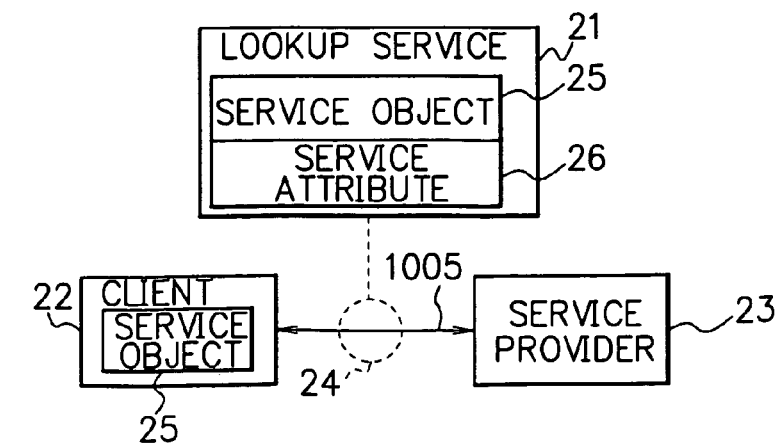

Referring now to the drawings, embodiments of the present invention will be explained in detail.

According to the present invention, in a distributed system in which a range of services are distributed in a network, it is possible to receive a service delivery by searching for a desired service using a terminal device connected to a network by wireless and/or wired-line, in particular, by wireless, and communicating with the service. The configuration of the distributed system is described below.

(1) A search service for searching a network for a service includes a master search service and a slave search service that are separately provided in the network and in a wireless terminal, respectively.

(2) The slave search service is provided with a cache function storing search results.

(3) An order of priority is stored in the cache by being related to the search results.

(4) The cached search results are controlled so as to be destroyed according to the order of priority in order to cope with overflows of the cache.

(5) Local information and commands (the term local means, for example, the relationship between the master search service and the slave search service) are exchanged between the master search service and the slave search service by the wireless communication.

(6) A protocol assuring communication quality in a wireless section is implemented as a communication means between the master search service and the slave search service, which is wireless communication.

Figure 2:
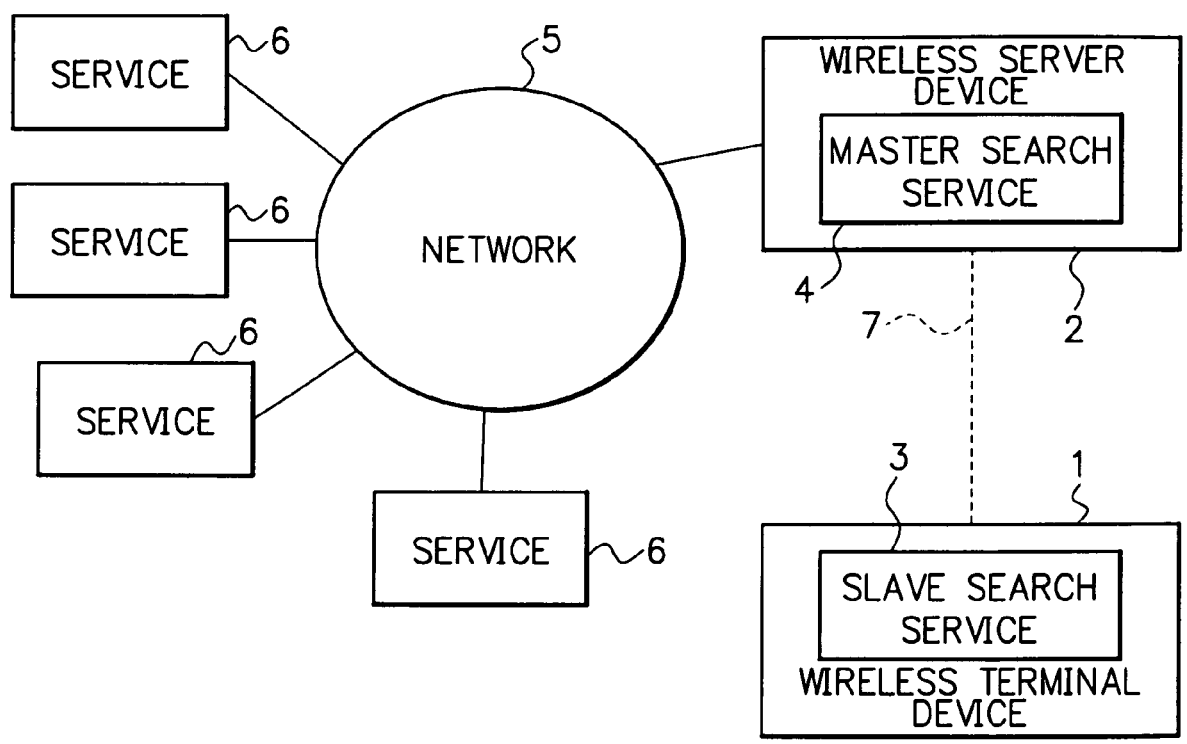
FIG. 2 is a schematic block diagram of a first embodiment of the present invention.

FIG. 2 is a block diagram of a first embodiment of the present invention. In FIG. 2, a plurality of services 6 are distributed in a network 5. Besides, a wireless server 2 exists in the network 5. Further, a master search service 4 is working in the wireless server 2.

On the other hand, a slave search service 3 is working in a wireless terminal device 1. The wireless terminal device 1 communicates with the wireless server 2 by wireless in a wireless communication section 7.

In this system, when the wireless terminal device 1 searches the services 6 distributed in the network 5, the wireless terminal device 1 does not search the network 5 directly, but starts by searching the slave search service 3. When a desired service is not detected in the slave search service 3, the slave search service 3 sends a command to the master search service 4 to search for the desired service, and receives search results at the master search service 4.

Once the slave search service 3 receives search results from the master search service 4, the search results are stored (cached) in the slave search service 3. Therefore, from the next time the wireless terminal device 1 searches for the same service, it is possible to complete the search only in the slave search service 3 by using the stored service.

Besides, it is possible to set up a protocol of the wireless communication between the slave search service 3 and the master search service 4 without tying up with the network communication protocol for service searching. Thereby, it is possible to uniquely set up a protocol and a command system to assure communication quality in the wireless communication section 7.

By the above configuration, it is possible to reduce communication traffic in the wireless section and assure the communication quality therein, in addition, to increase efficiency of the service searching in the network.

Referring to drawings, a detailed explanation will be given of a first embodiment according to the present invention. The system in this embodiment has the same configuration as that shown in FIG. 2. Incidentally, it is assumed that Jini explained hereinbefore is implemented in the network 5 as a network middleware (refer to FIGS. 1A to 1D).

Figure 3:
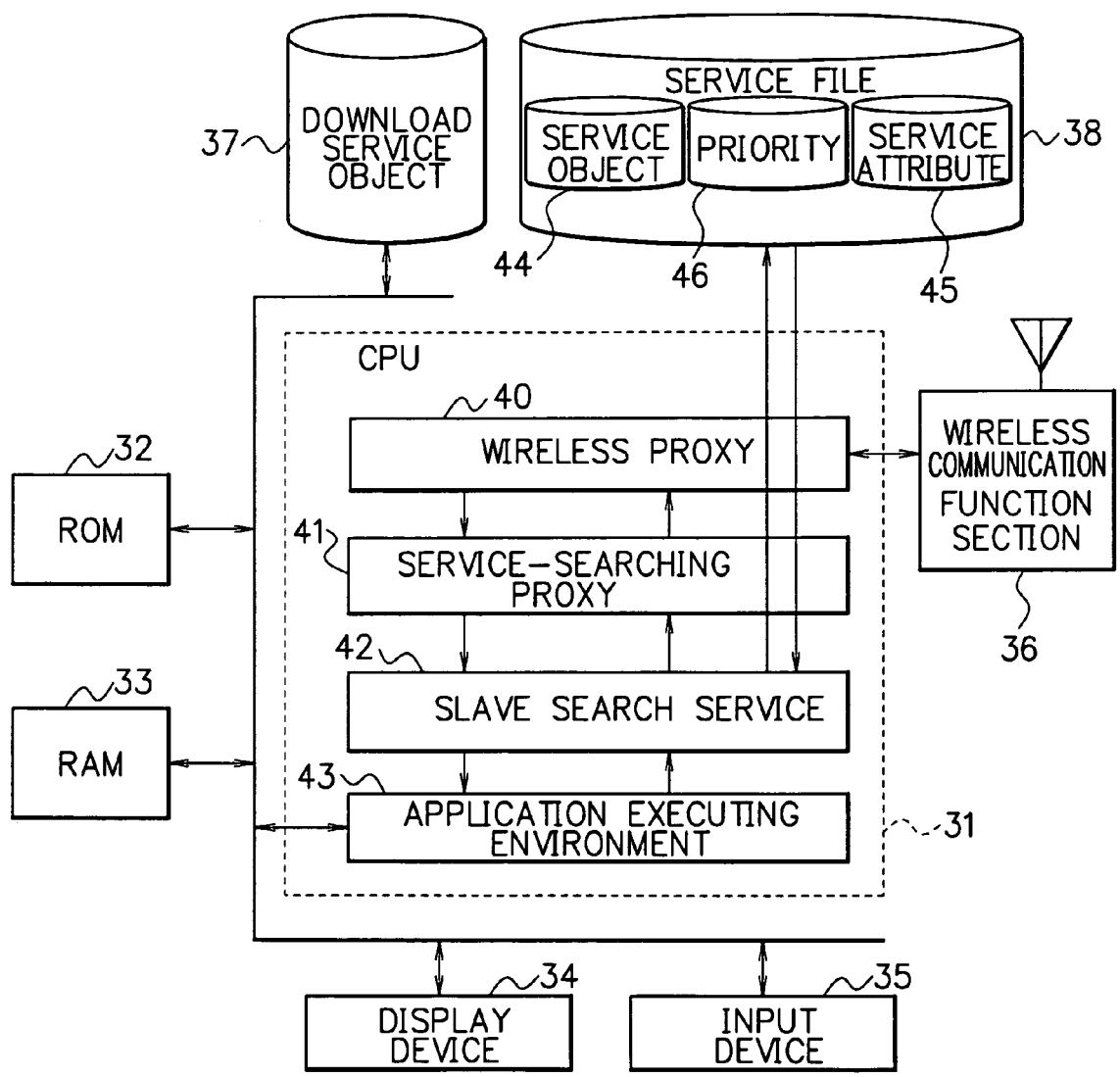
FIG. 3 is a block diagram showing a configuration of a wireless terminal device according to the first embodiment of the present invention.
Figure 5:
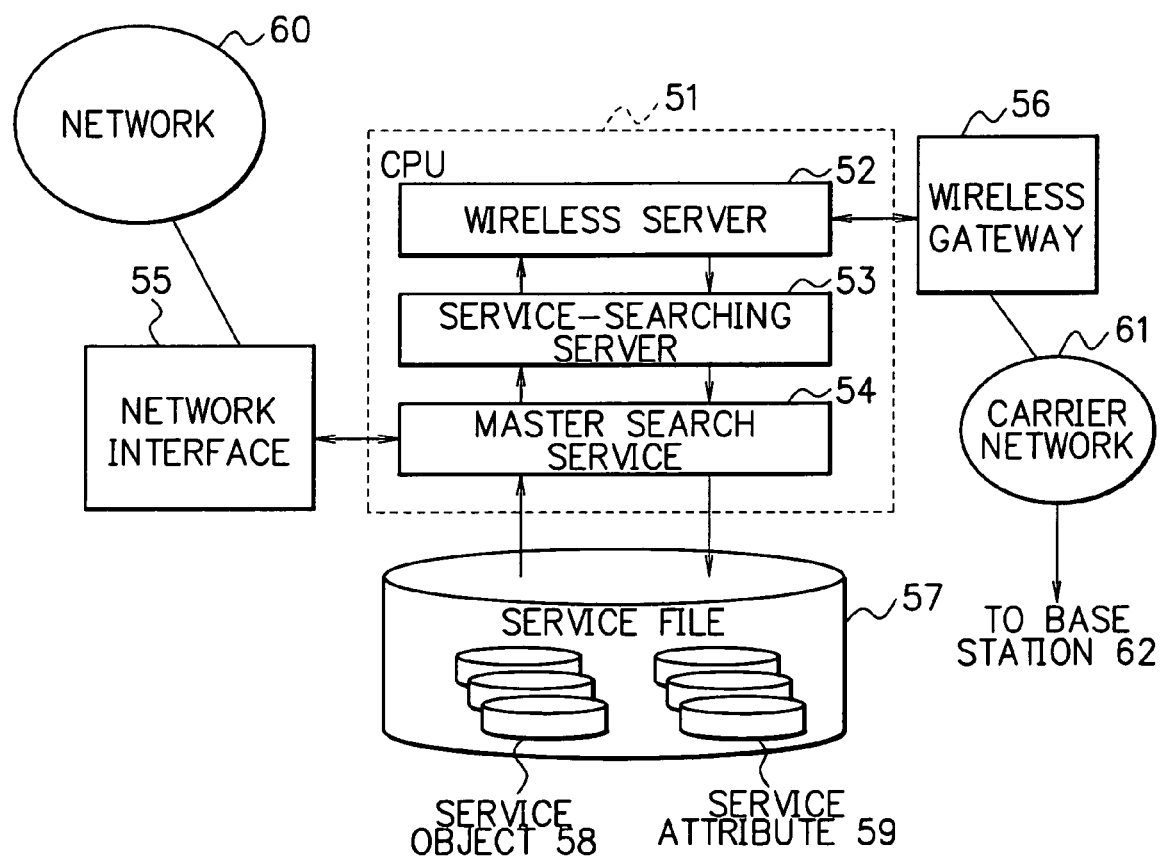
FIG. 5 is a block diagram showing a configuration of a server according to the first embodiment of the present invention.
Figure 6:
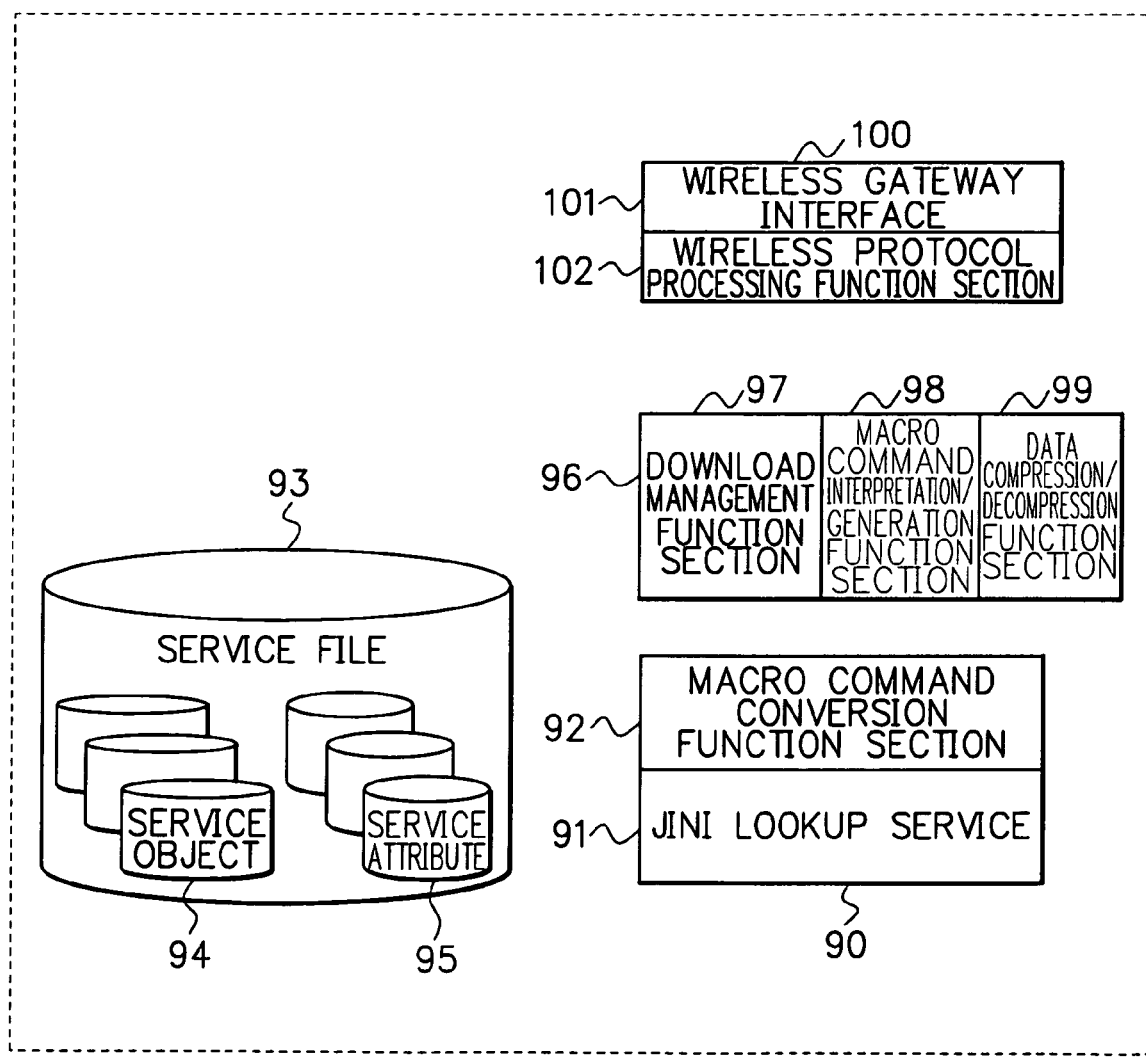
FIG. 6 is a diagram explaining functions of a server section in detail according to the first embodiment of the present invention.
Figure 7:
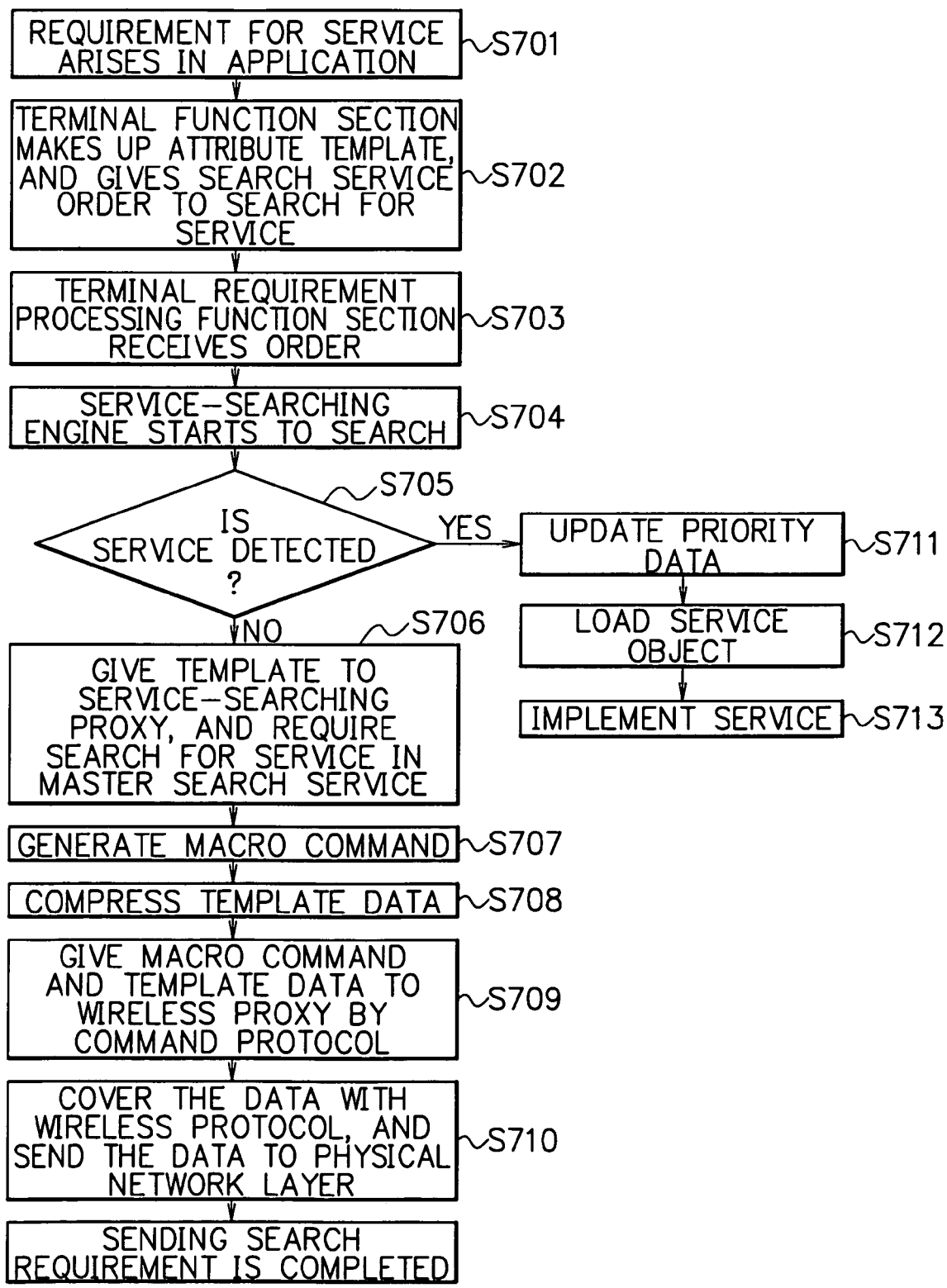
Figure 8:
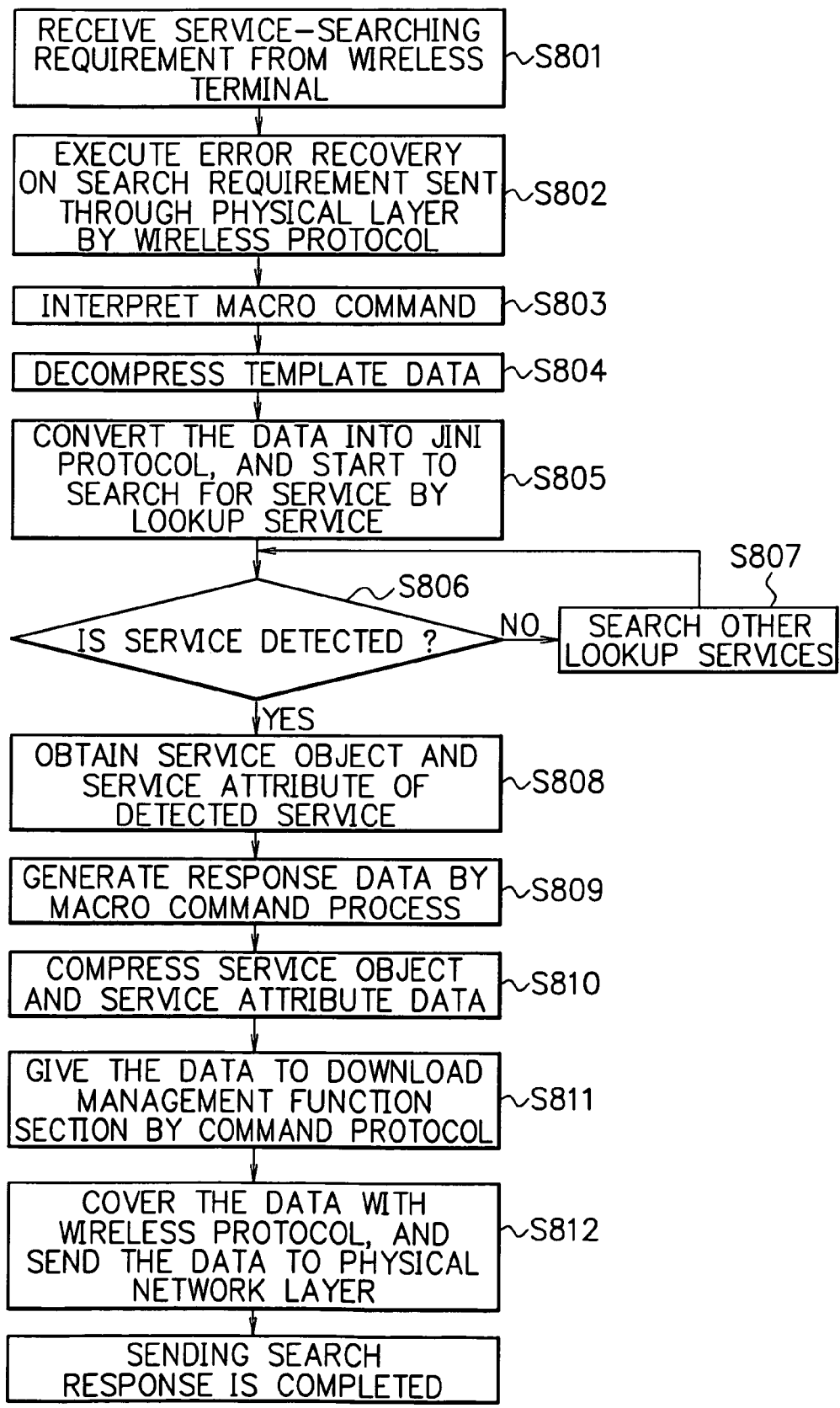

FIG. 3 is a block diagram showing a configuration of a wireless terminal device according to the first embodiment. FIG. 4 is a diagram explaining a wireless terminal device section in detail according to the first embodiment. FIG. 5 is a block diagram showing a configuration of a server according to the first embodiment. FIG. 6 is a diagram explaining a server section in detail according to the first embodiment. Besides, FIGS. 7, 8 and 9 are functional flowcharts explaining operations of the first embodiment.

Referring to the block diagram shown in FIG. 3, the wireless terminal device in this embodiment comprises CPU (central processing unit) 31, ROM (read only memory) 32, RAM (random access memory) 33, an input device 35, a display device 34, a service file 38 as a storage means for service objects etc., and a wireless communication function 36. The CPU 31 executes programs stored in the ROM 32 and/or RAM 33. Thereby, it is possible to execute each process of a slave search service 42, a service-searching proxy 41 and a wireless proxy 40 as well as realize an application executing environment 43.

The Jini system is implemented in the wireless terminal device in order to describe embodiments of the present invention. The slave search service 42 serves as the Lookup service in the Jini system.

When the wireless terminal device shown in FIG. 3 is a client, the client can receive a service delivery from a service provider after a download service object 37 is executed under the application executing environment 43.

FIG. 4 is a diagram explaining functions of the wireless terminal device section in detail according to the first embodiment. Referring to FIG. 4, the wireless terminal device implements a wireless terminal function 70, a slave search service 74, a service-searching proxy 79, a service file 83 and a wireless proxy 86. By these functions, a user can use the device as a wireless terminal. Besides, the wireless terminal function 70 includes an input means 72 and a display means 73 etc. The slave search service 74 implements a file management function 75, a priority data generation function 76, a service-searching engine 77, a terminal requirement processing function 78 etc. The service file 83 stores one or more service objects 84, one or more service attributes 85, and priority data 89. The service-searching proxy 79 implements a download management function 80, a macro command interpretation/generation function 81, a data compression/decompression function 82 etc. Further, the wireless proxy 86 implements a wireless protocol processing function 88 and a network/transport layer function 87 for controlling a physical layer(s) of the wireless communication.

As shown in FIG. 5, a server in this embodiment comprises a CPU 51, a service file 57, a wireless gateway 56 and a network interface 55. Understandably, ROM and RAM for storing a program(s) and data exist around the CPU 51 (not shown in FIG. 5). The CPU 51 serves as a server executing each operation of a wireless server 52, a service-searching server 53, and a master search service 54.

The server is connected to a network 60 (equivalent to the network 5 shown in FIG. 2) such as LAN and the Internet through the network interface 55. Thereby, the network interface 55 can communicate with a range of services existing in the network.

Besides, the wireless gateway 56 connected to a carrier network 61 can communicate with the wireless terminal device (shown in FIG. 3) through a base station 62. Further, the Jini system that is the known network middleware is implemented in these functions.

Seen from the network 60, the master search service 54 in the server serves as the Lookup service of Jini. Besides, the service file 57 can store a service object(s) 58 and a service attribute(s) 59, which are registered by the service registration protocol of Jini (Join protocol).

FIG. 6 is a diagram explaining functions of a server section in detail according to the first embodiment. As shown in FIG. 6, a master search service 90 comprises a Jini Lookup service 91 and a macro command conversion function 92. A service-searching server 96 implements a download management function 97, a macro command interpretation/generation function 98 and a data compression/decompression function 99. Further, a wireless server 100 implements a wireless protocol processing function 102 and a wireless gateway interface 101.

Under such circumstances, when a service provider implementing the Jini function is connected to the network 60 shown in FIG. 5, as described hereinbefore, the Lookup service in the network is searched by the known Jini function. At this time, the service provider connected through the network 60 also detects the master search service 54. Then in the next step, the service objects and the service attributes held by the service provider are registered in the Lookup service by the Join protocol.

By the way, the slave search service 42 existing in the wireless terminal device shown in FIG. 3 is secluded from the network 60 by the server shown in FIG. 5. Thereby, the service provider in the network 60 does not detect the slave search service 42.

In the wireless terminal device shown in FIG. 3, an application program installed therein is executed. Besides, functions as a terminal device are realized by input from the input device 35 and display output to the display device 34. However, in some cases, a user requires such a service as is not stored in the terminal device.

In this case, the application executing environment 43 in the terminal device searches the slave search service 42 for the required service. This operation is executed by the protocol of the Jini system implemented in the wireless terminal device shown in FIG. 3.

Having received the requirement, the slave search service 42 searches for the required service from one or more service objects registered in the slave search service 42 using a service attribute 45 as a key. When the desired service is detected in this search (for example, the desired service is the service object 44), the service object 44 in the service file 38 is loaded to the application executing environment 43 without a communication from the wireless terminal. Then, the service delivery is realized.

On the other hand, when the required service is not detected in the slave search service 42, the slave search service 42 gives information necessary to search for the desired service to the service-searching proxy 41, and entrusts the search to the server (refer to FIG. 5).

In this case, the communication between the wireless terminal and the server is logically executed between the service-searching proxy 41 shown in FIG. 3 and the service-searching server 53 shown in FIG. 5. Therefore, the communication protocol between the service-searching proxy 41 and the service-searching server 53 is not restricted by any protocol regulated in Jini. Namely, the communication protocol just has to enable the transmission of information necessary for the service-searching server 53 to communicate with other Jini services existing in the master search service and the network 60.

Incidentally, the wireless communication is susceptible to electric field intensity of electric wave and noise etc. in the surrounding environment as compared to general networks such as LAN. Thereby, it is often the case that the communication quality is deteriorated. Therefore, it is necessary to wrap the logical communication in order to secure the communication quality. This is realized by the functions of the wireless proxy 40 shown in FIG. 3 and the wireless server 52 shown in FIG. 5.

As described above, the logical communication is executed between the service-searching proxy 41 and the service-searching server 53. Further, the wireless proxy 40 and the wireless server 52 stand inside the service-searching proxy 41 and the service-searching server 53. Between the wireless proxy 40 and the wireless server 52, data that are logically communicated are converted into packets of a certain size, and the packets are cached. In addition, errors in communication are monitored therebetween, and accordingly, error retry, error recovery, resend control etc. are executed.

By this means, having received the requirement from the service-searching proxy 41, the service-searching server 53 searches the master search service 54. When the desired service is detected in the master search service 54, the service object 58 and the service attribute 59 corresponding to the required service are returned to the service-searching server 53. After that, the service object 58 and the service attribute 59 are returned to the wireless proxy 40 and the service-searching proxy 41 in the wireless terminal device through the wireless server 52, the wireless gateway 56 and the carrier network 61.

The service-searching proxy 41 stores the downloaded service object 58 as the download service object 37 and also loads it to the application executing environment 43, and executes the service.

Besides, the service-searching proxy 41 gives the downloaded service object 58 and the service attribute 59 to the slave search service 42. The slave search service 42 stores (caches) the service object 58 and the service attribute 59 in the service file 38. At the same time, priority data 46 of the service related to the service object 58 is also recorded.

Namely, the slave search service 42 shown in FIG. 3 transforms the importance and priority of the received service object 58 and service attribute 59 into data as the priority data 46, which is stored in the service file 38 along with the service object 58 and service attribute 59.

In FIG. 3, the service object 44 and the service attribute 45 stored in the service file 38 are what is required from the wireless terminal device shown in FIG. 3 one or more times up to now. The service object 44 and the service attribute 45 may be described as a service unique to the wireless terminal device. Thereby, in the case where a plurality of services exists in the service file 38 (namely, in the case where a plurality of service objects 44 and a plurality of service attributes 45 exist therein), it is possible to decide the importance and the possibility of reuse of the services etc. within the wireless terminal device on the basis of the priority data.

There is a limit to the service file 38 in the wireless terminal device shown in FIG. 3. Thereby, when an overflow is occurred by storing new data, the slave search service 42 deletes data one by one in the order of ascending priorities from the service file 38 referring to the priority data 46.

Next, referring to the functional flowcharts shown in FIGS. 7, 8 and 9, an explanation will be given of operations of the first embodiment according to the present invention.

Referring to FIG. 7, when a requirement for a certain service arises in an application of the wireless terminal device (S701), template information for specifying the service is made up (S702). The attribute information of the service is stored in the template information in order to specify the service. The wireless terminal function 70 shown in FIG. 4 gives the template to the terminal requirement processing function 78 in the slave search service 74, and gives an order to search for the service (S702).

After the terminal requirement processing function 78 receives the order to search for the service (S703), the service-searching engine 77 is activated and starts to search the service file 83 (S704). When the required service is detected in the service file 83 (S705/Yes), the priority data of the service object is updated (S711). Then, the service object is loaded (S712), and the service is implemented (S713).

On the other hand, when the required service is not detected in the service file 83 (S705/No), the slave search service 74 immediately commands the service-searching proxy 79 to start a process to request the master search service 90 shown in FIG. 6 to search for the required service. At this time, the template that the terminal requirement processing function 78 has used is also given to the service-searching proxy 79 (S706). Incidentally, when it is the first time to search for a service in the wireless terminal device, there are no contents in the service file 83 (S705/No). Therefore, the same process as S706 is executed.

In the service-searching proxy 79, the macro command interpretation/generation function 81 generates a macro command to the master search service 90 (S707). In addition, the data compression/decompression function 82 compresses the template data (S708).

After that, the macro command and the template data are given to the wireless proxy 86 (S709). Then, the wireless protocol processing function 88 assures the communication quality, and sends the macro command and the template data to the physical network layer (S710). By this means, the search requirement sending process finishes.

Referring to FIG. 8, the requirement sent from the wireless terminal device arrives at the wireless gateway interface 101 in the server section shown in FIG. 6 through the carrier network (S801). As with the above operation, the wireless protocol processing function 102 assures the communication quality of the requirement information (S802). The received requirement information is given to the service-searching server 96, in which the macro command interpretation/generation function 98 interprets the macro command (S803), as well as the data compression/decompression function 99 decompresses the template data (S804). This data is given to the master search service 90, in which the macro command conversion function 92 converts the data into a search protocol of Jini and gives it to the Jini Lookup service 91 as a search requirement (S805).

The Jini Lookup service 91 searches a service file 93, which is managed by the Jini Lookup service 91, using the given template as a key (S806). When the desired service is not detected in the service file 93 (S806/No), as here is no detailed description, the Jini Lookup service 91 may search other external Lookup services or execute a process of returning an error message informing that the desired service has not been found under the condition specified by the macro command (S807).

On the other hand, when the desired service is detected (S806/Yes), the Jini Lookup service 91 gives the service object 94 and the service attribute 95 corresponding to the desired service to the service-searching server 96 (S808). In the service-searching server 96, the macro command interpretation/generation function 98 generates a macro command that indicates a response message (S809). Besides, the data compression/decompression function 99 compresses the data of the given service object 94 and service attribute 95 (S810). The macro command and the compressed data are given to the download management function 97 (S811). Having received the data to send, the download management function 97 transmits the macro command and the download data to the wireless terminal through the wireless server 100 (S812). By this means, the search response sending process finishes.

Referring to FIG. 9, the response message from the server section arrives at the wireless terminal device through the carrier network (S901). As with the operation in the above description, the communication quality of the arrived information is assured by the wireless proxy 86 shown in FIG. 4 (S902). The correctly received response message (including the response macro command and the download data) is given to the service-searching proxy 79. Then, the download management function 80 separates the download data from the macro command. The macro command interpretation/generation function 81 interprets the separated macro command (S903), and thereby, the search results at the master search service are recognized (S904).

When the search has been successfully carried out, the data compression/decompression function 82 decompresses and restores the separated download data (S905). The restored service object and the service attribute are transmitted to the file management function 75.

Next, the priority data generation function 76 generates priority data 89 corresponding to the newly downloaded service (S906).

The priority data may be generated on the basis of kinds of services, frequency of use (for example, there may be such a management method as: when first time a new service is downloaded, high points are given to the service; however, each time another service is used, the service loses some points; and when the service is required again, some points are added), level of importance as an absolute value seen from the terminal device function etc.

Having searched the service file 83, the file management function 75 judges whether or not there are free areas enough to store the downloaded data (S907). When there is no free area in the service file 83 (S907/No), the priority data 89 of the already stored service objects 84 and service attributes 85 are searched, and the stored data is deleted in the order of ascending priorities until it becomes possible to secure the space for the downloaded data (S908). In this process, the service object 84 is deleted in pairs with the corresponding service attribute 85.

When there are free areas (S907/Yes), the priority data 89 generated at the priority data generation function 76 is given to the file management function 75. The given priority data 89 is recorded in the service file 83 along with the downloaded service object and service attribute (S910). Antecedent to that, the priority data in the service file is updated according to need (S909).

Besides, at the same time of the recording, the service object 84 is loaded to an application executing environment 71 (S911), and then, the service is implemented (S912). Hereby, an environment for delivering the service starts to operate. Incidentally, the service itself may actually start to work depending on the service object 84.

According to the above-described first embodiment, the following effects are obtained. As described hereinbefore, the wireless terminal device is provided with a cache function storing service objects. Thereby, it is possible to have a local slave search service for private use. In respect of services cached therein, it is possible to construct an environment for receiving the service delivery without communicating with a network again. Namely, depending on contents of the services, it may be possible to receive the service deliveries without communication.

Especially, the slave search service records the service object with the priority data in the service file, and deletes the service object of lower priority if necessary. Namely, high-priority and important services are being stored at the point. Thereby, it is possible to increase percent hit rates (usage rates) of the service objects stored in the wireless terminal device. Actually, it is possible to further reduce searches accompanying communication.

Besides, in the logical connection between the service-searching proxy and the service-searching server, the protocol of the network middleware can be converted into a macro command, and communication is executed. Consequently, processes to a network by the network middleware can be entrusted to the service-searching server and the master search service. Thereby, it is possible to reduce overhead by the protocol of the network middleware (Jini, in this embodiment), and further, reduce traffic in the wireless communication.

Further, in the wireless communication between the wireless terminal device and the server, the wireless proxy and the wireless server exist. They realize a protocol for assuring communication quality in the wireless section. Further, they can implement a transmission assurance of information necessary to service searching and a recovery that is highly efficient in case of communication interruptions. Thereby, it is possible to assure the quality of the wireless communication.

Next, an explanation will be given of a second embodiment of the present invention. FIG. 10 is a block diagram showing a configuration of a wireless terminal device according to the second embodiment. Referring to FIG. 10, the wireless terminal device further comprises a switching means 47 along with the same configuration as the first embodiment (refer to FIG. 3). Each reference numeral shown in FIG. 10 is the same as that shown in FIG. 3, and repetitive explanations will be abbreviated. The switching means has two inputs: one is connected to the service-searching proxy 41; and the other is connected to the application executing environment 43.

By the function of the switching means 47, the application executing environment 43 can choose either to search the slave search service 42 in the wireless terminal or to directly entrust the service searching to the server section instead of implementing the search in the slave search service 42 according to the generated requirement for the service.

In the present invention, it is to be appreciated that those embodiments described above can be changed or modified without departing from the scope and spirit of the present invention. For example, each of the first and second embodiments has a configuration comprising a single wireless communication means. However, it is also possible to comprise a plurality of communication means and select one from them. By this means, it is possible to construct a system wherein a searching method can be changed according to communication means to be used.

As set forth hereinabove, the following effects are brought about.

First, in respect of services stored in a local service-searching service (for private use) existing in the wireless terminal device, it is possible to construct an environment to receive a service delivery without communication with a network. This is because the wireless terminal is provided with a slave search service for private use, which stores service objects.

Secondly, it is possible to increase percent hit rates of the service objects stored in the wireless terminal device. This is because the slave search service records the service object with the priority data when it stores the service object in the service file, and deletes the service object of lower priority according to the priority data if necessary. Thereby, high-priority and important services are being stored at the point.

Thirdly, it is possible to reduce overhead of a protocol of a network middleware (for example, Jini) and traffic in a wireless communication. This is because, in a logical connection between a service-searching proxy and a service-searching server, communication can be executed after converting the protocol of the network middleware into a macro command, and processes to a network by the network middleware can be entrusted to the service-searching server and a master search service.

Fourthly, there is realized a quality assurance in the wireless communication. This is because a wireless proxy and a wireless server exist in the wireless communication between the wireless terminal device and the server, which realize a protocol to assure the communication quality in the wireless section, and implement a transmission assurance of information necessary to service searching and a recovery that is highly efficient in case of communication interruptions.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A service searching system that searches for a service in a distributed system wherein a range of services are distributed in a network, comprising:
   a wireless server device connected to the network and implementing a master search service; and
   a wireless terminal device implementing a slave search service, being capable of communicating with the server wirelessly, and being capable of utilizing the master search service, wherein:
   the wireless terminal device includes a storage means for caching at least one service object obtained through the master search service;
   in the case of searching for the service through the slave search service, the wireless terminal device begins by searching the at least one service object cached in the storage means;
   in the case of failing to detect the service in the slave search service, the wireless terminal device searches for the service through the master search service;
   priority data corresponding to each of at least one service object that is to be cached in the wireless terminal device is generated on the basis of at least one selected from necessity, importance and frequency in use of each of the at least one service object in the wireless terminal device;
   the priority data is related to each of the at least one service object and cached together;
   the priority data is updated according to use of the at least one service object; and
   when the cached at least one service object overflows in order to cache a new service object in the wireless terminal device, at least one low-priority service object is deleted on the basis of the priority data.

2. A service searching system that searches for a service in a distributed system wherein a range of services are distributed in a network, comprising:
   a wireless server device connected to the network and implementing a master search service; and
   a wireless terminal device implementing a slave search service, being capable of communicating with the server wirelessly, and being capable of utilizing the master search service, wherein:
   the wireless terminal device includes a storage means for caching at least one service object obtained through the master search service;
   in the case of searching for the service through the slave search service, the wireless terminal device begins by searching the at least one service object cached in the storage means; and
   in the case of failing to detect the service in the slave search service, the wireless terminal device searches for the service through the master search service,
   wherein, when the wireless terminal device searches the wireless server device for the service through the master search service, communication between the wireless terminal device and the wireless server device is executed by being converted into a command and a parameter in which an amount of communication data is reduced.

3. A service searching system that searches for a service in a distributed system wherein a range of services are distributed in a network, comprising:
   a wireless server device connected to the network and implementing a master search service; and
   a wireless terminal device implementing a slave search service, being capable of communicating with the server wirelessly, and being capable of utilizing the master search service, wherein:
   the wireless terminal device includes a storage means for caching at least one service object obtained through the master search service;
   in the case of searching for the service through the slave search service, the wireless terminal device begins by searching the at least one service object cached in the storage means;
   in the case of failing to detect the service in the slave search service, the wireless terminal device searches for the service through the master search service;
   priority data corresponding to each of at least one service object that is to be cached in the wireless terminal device is generated on the basis of at least one selected from necessity, importance and frequency in use of each of the at least one service object in the wireless terminal device;
   the priority data is related to each of the at least one service object and cached together; and
   the priority data is updated according to use of the at least one service object, wherein, when the wireless terminal device searches the wireless server device for the service through the master search service, communication between the wireless terminal device and the wireless server device is executed by being converted into a command and a parameter in which an amount of communication data is reduced.

4. The service searching system as claimed in claim 1, wherein, when the wireless terminal device searches the wireless server device for the service through the master search service, communication between the wireless terminal device and the wireless server device is executed by being converted into a command and a parameter in which an amount of communication data is reduced.

5. A service searching system that searches for a service in a distributed system wherein a range of services are distributed in a network, comprising:
  a wireless server device connected to the network and implementing a master search service; and
  a wireless terminal device implementing a slave search service, being capable of communicating with the server wirelessly, and being capable of utilizing the master search service, wherein:
  the wireless terminal device includes a storage means for caching at least one service object obtained through the master search service;
  in the case of searching for the service through the slave search service, the wireless terminal device begins by searching the at least one service object cached in the storage means; and
  in the case of failing to detect the service in the slave search service, the wireless terminal device searches for the service through the master search service, wherein a wireless communication protocol between the wireless terminal device and the wireless server device implements a means for assuring communication quality in a wireless section as a protocol, said means for assuring communication quality comprising at least one of error-retry and error-recovery.

6. A service searching system that searches for a service in a distributed system wherein a range of services are distributed in a network, comprising:
  a wireless server device connected to the network and implementing a master search service; and
  a wireless terminal device implementing a slave search service, being capable of communicating with the server wirelessly, and being capable of utilizing the master search service, wherein:
  the wireless terminal device includes a storage means for caching at least one service object obtained through the master search service;
  in the case of searching for the service through the slave search service, the wireless terminal device begins by searching the at least one service object cached in the storage means;
  in the case of failing to detect the service in the slave search service, the wireless terminal device searches for the service through the master search service;
  priority data corresponding to each of at least one service object that is to be cached in the wireless terminal device is generated on the basis of at least one selected from necessity, importance and frequency in use of each of the at least one service object in the wireless terminal device;
  the priority data is related to each of the at least one service object and cached together; and
  the priority data is updated according to use of the at least one service object,
  wherein a wireless communication protocol between the wireless terminal device and the wireless server device implements a means for assuring communication quality in a wireless section as a protocol.

7. The service searching system as claimed in claim 1, wherein a wireless communication protocol between the wireless terminal device and the wireless server device implements a means for assuring communication quality in a wireless section as a protocol.

* * * * *